Feb. 5, 1963    M. ARAI    3,076,746
NEW ANTIBIOTICS AZALOMYCIN B AND F AND
A PROCESS FOR THE PRODUCTION THEREOF
Filed May 23, 1960    4 Sheets-Sheet 1
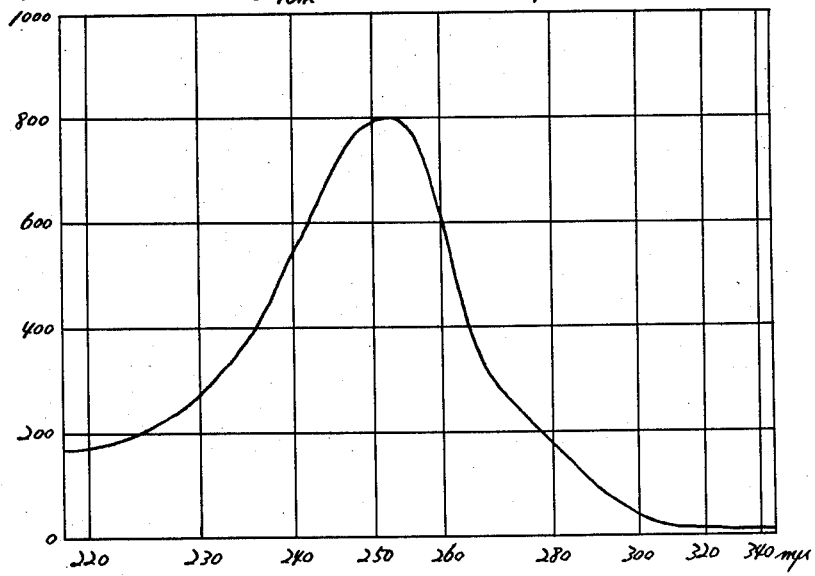
Fig. 1 Ultraviolet spectrum of azalomycin B
$E_{1cm}^{1\%} = 790$ at $252.5$ mμ (in methanol)
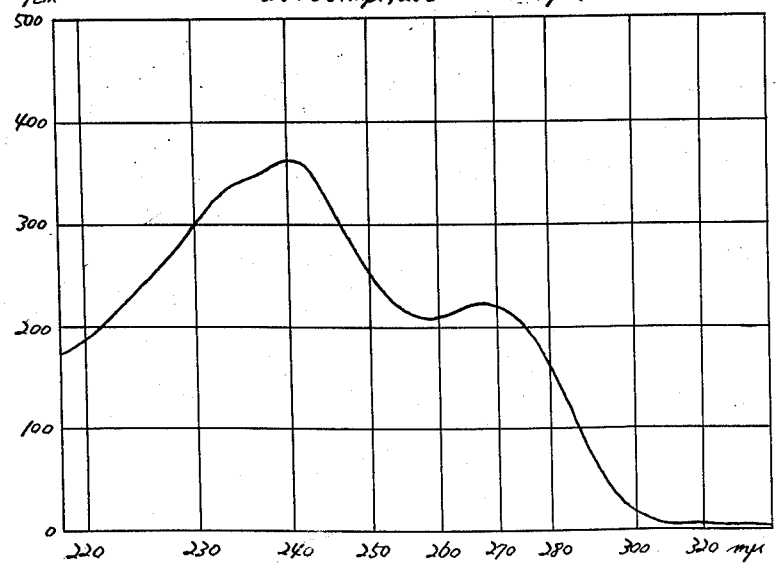
Fig. 2 Ultraviolet spectra of azalomycin F
Azalomycin F: $E_{1cm}^{1\%} = 385$ at $240$ mμ; $216$ at $258$ mμ; $235$ at $268$ mμ (in methanol)
INVENTOR.
MAMORU ARAI
BY
Mason, Fenwick & Lawrence
Attorneys

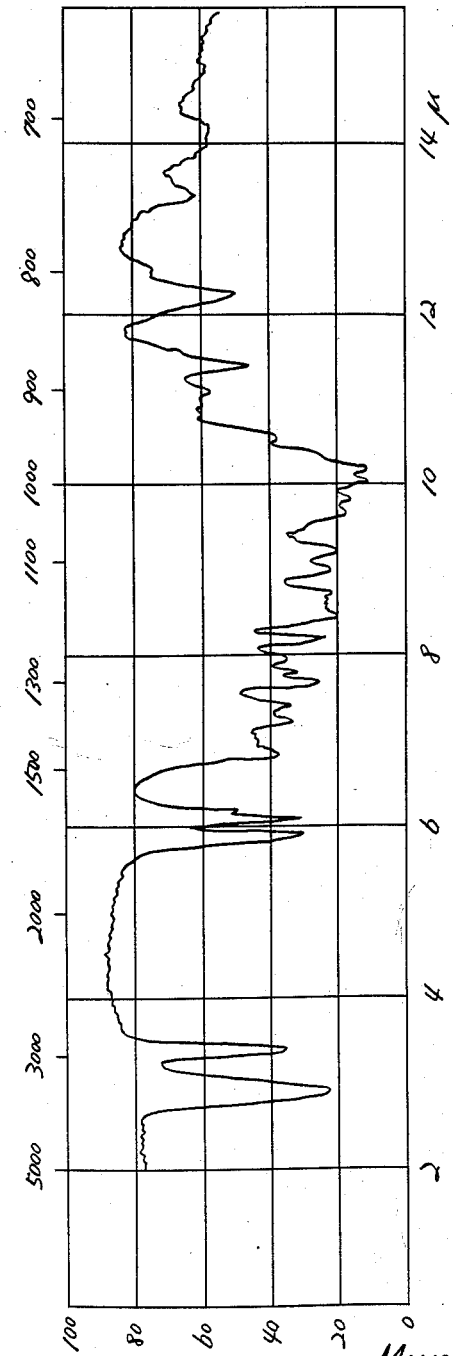

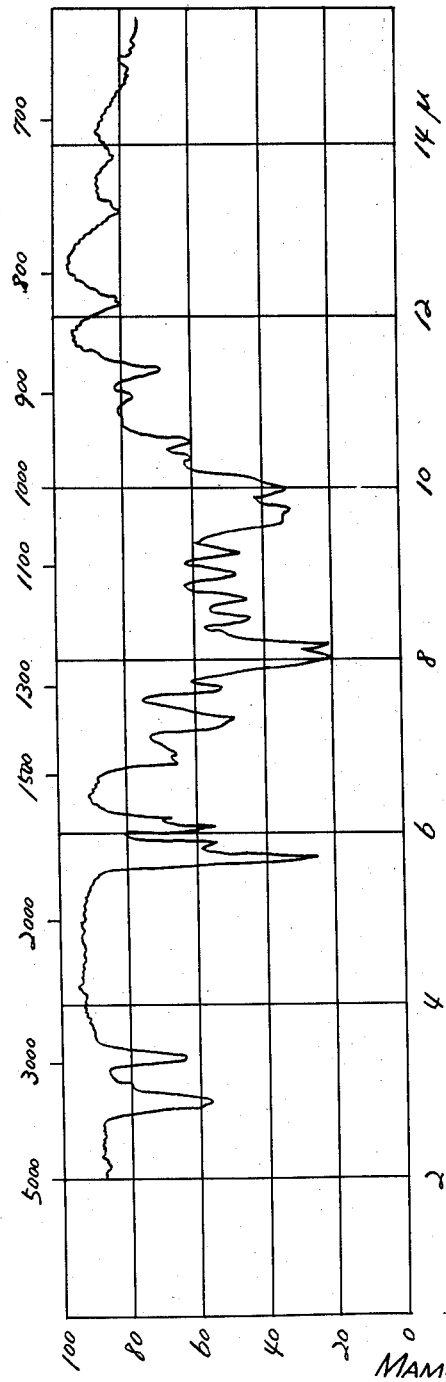
Fig. 3b Diacetylazalomycin B

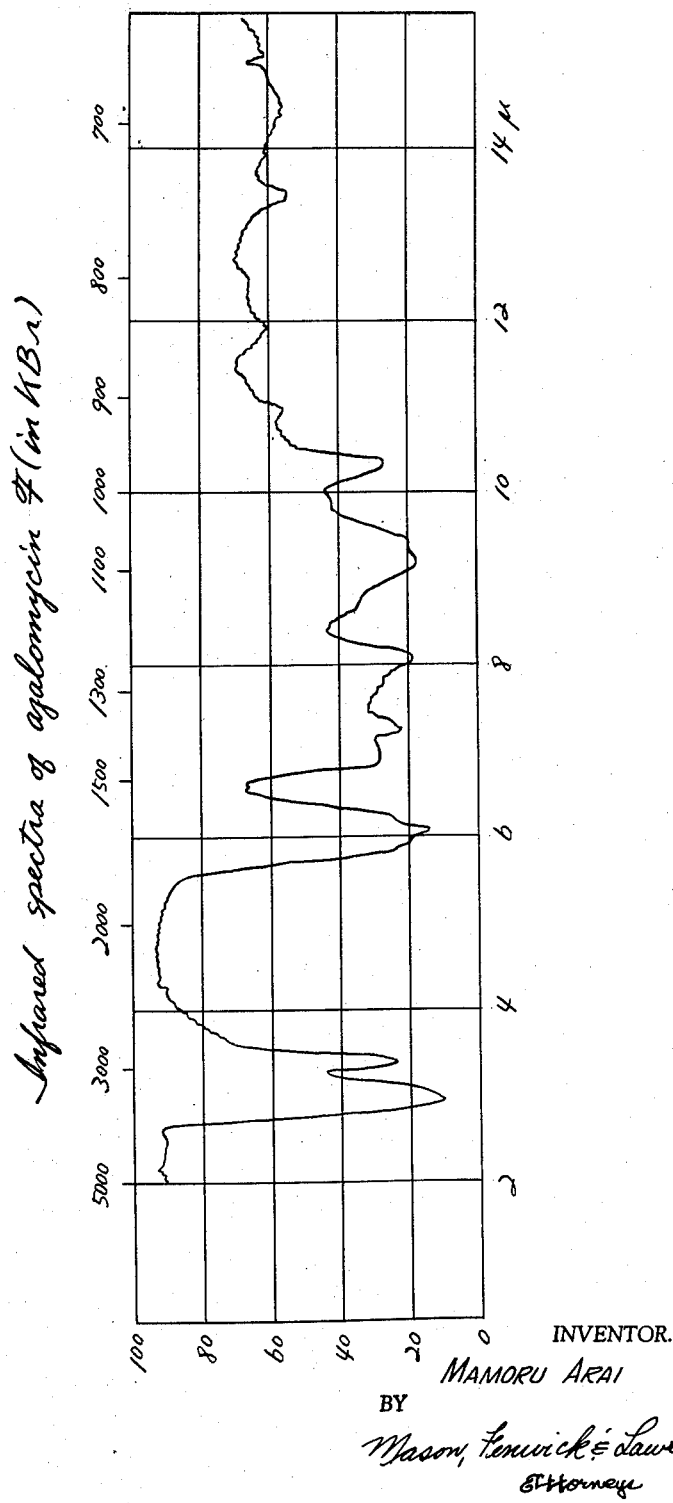

3,076,746
NEW ANTIBIOTICS AZALOMYCIN B AND F AND A PROCESS FOR THE PRODUCTION THEREOF
Mamoru Arai, Philadelphia, Pa., assignor to Sankyo Co., Ltd., Tokyo, Japan, a corporation of Japan
Filed May 23, 1960, Ser. No. 30,849
Claims priority, application Japan May 24, 1959
9 Claims. (Cl. 167—65)

This invention relates to new and useful substances possessing antimicrobial activities and to methods for their production. More particularly, it relates to new and useful antibiotics called azalomycins B and F and to methods for production of the antibiotics.

It is an object of this invention to provide new and useful antibiotics azalomycins B and F.

Another object of this invention is to provide methods of producing these antibiotics azalomycins B and F by microbiological processes.

Physical and chemical properties of azalomycins B and F are shown below.

PHYSICAL AND CHEMICAL PROPERTIES OF AZALOMYCIN B

Azalomycin B is a neutral white needle crystalline substance and melts at 185–187° C. with decomposition. The analytical data are as follows.

Calcd. for $C_{14}H_{24}O_5$: C, 61.74; H, 8.88; $OCH_3$, 11.40; M.W. 272.33. Found: C, 61.88; H, 8.72; $OCH_3$, 10.12; M.W. 284 (by Rast's method).

It contains no nitrogen, halogen or sulfur. It gives diacetate as white needle crystals by treatment with pyridine and acetic anhydride. Elementary analysis of the diacetate gives the following results.

Calcd. for $C_{14}H_{22}O_5(CH_3CO)_2$: C, 60.66; H, 7.92. Found: C, 60.29; H, 7.75.

The degree of specific rotation of azalomycin B is $[\alpha]_D^{25} = -48°$ (c.=1 in methanol). The ultraviolet absorption spectrum is shown in FIG. 1. It has a characteristic absorption maximum at $$252.5 \text{ m}\mu \ (E_{1\,cm.}^{1\%} = 790)$$

in a methanol solution. The infrared absorption spectrum of azalomycin B and diacetylazalomycin B in potassium bromide pellet are shown in FIGS. 3a and 3b respectively. Azalomycin B exhibits characteristic absorption bands in the infrared region of the spectrum, in potassium bromide pellet, at the following frequencies expressed in reciprocal centimeters: 3450, 2970, 1695, 1640, 1565, 1460, 1420, 1380, 1345, 1300, 1280, 1250, 1220, 1175, 1145, 1110, 1085, 1050, 1030, 1015, 995, 980, 945, 900, 876, 860, 815, 795, 745, 716, 705, 673 and 664. Diacetylazalomycin B exhibits characteristic absorption bands in the infrared region of the spectrum, in potassium bromide pellet, at the following frequencies expressed in reciprocal centimeters: 3470, 2970, 1750, 1700, 1645, 1620, 1470, 1450, 1435, 1390, 1370, 1300, 1250, 1227, 1182, 1150, 1112, 1083, 1040, 1028, 1000, 965, 950, 905, 875, 820, 753 and 714.

Azalomycin B is soluble in methanol, ethanol, and chloroform, moderately in acetone and ethyl acetate and only sparingly in ether and benzene, but almost insoluble in water and petroleum ether. It gives a dark brownish black color by Tollens test, but makes no silver mirror. Fehling test gives a green color and potassium permanganate is decolorized. Molisch, anthrone and ferricchloride tests are negative.

PHYSICAL AND CHEMICAL PROPERTIES of AZALOMYCIN F

Azalomycin F is a neutral white needle crystalline substance. It melts at 125–127° C. with decomposition. Analytical data are as follows.

Calcd. for $C_{30}H_{50}O_{10}N_2$: C, 60.18; H, 8.42; N, 4.68; M.W. 598.72. Found: C, 60.41; H, 8.57; N, 4.33.

Being insoluble in camphor, an approximate molecular weight is calculated by Berger-Akiya method in methanol to find that it is 600. The degree of specific rotation of azalomycin F is $[\alpha]_D^{22} = +46°$ (c.=1 in methanol). The ultraviolet absorption spectrum is shown in FIG. 2. It has characteristic absorption maxima at $$240 \text{ m}\mu \ (E_{1\,cm.}^{1\%} = 385)$$

and $$268 \text{ m}\mu \ (E_{1\,cm.}^{1\%} = 235)$$

and minimum at $$258 \text{ m}\mu \ (E_{1\,cm.}^{1\%} = 216)$$

The infrared absorption spectrum of azalomycin F in potassium bromide pellet is shown in FIG. 4. Azalomycin F exhibits characteristic absorption bands in the infrared region of the spectrum, in potassium bromide pellet, at the following frequencies expressed in reciprocal centimeters: 3460, 2940, 1690, 1645, 1555, 1450, 1380, 1285, 1240, 1150, 1085, 970, 915, 875, 840, 805, 745, 690 and 662.

Azalomycin F is soluble in methanol and ethanol, moderately in 20% aqueous acetone and sparingly in acidic water, but almost insoluble in alkaline water, acetone, ethyl acetate and chloroform.

It gives a dark brownish black color by Tollens test, a brown color in concentrated $H_2SO_4$ and a wine color in concentrated HCl. Molisch, anthrone, Fehling, ferricchloride, ninhydrin, Millon and biuret tests are negative. However, it responds positively to the ninhydrin test after 2 minutes' hydrolysis with 5 N HCl.

The aqueous solution of both azalomycin B and F are more stable at pH 6.0 than alkaline or more acidic pH. After heating at 100° C. for 5 minutes, at pH 6, azalomycin B does not show decrease in its activity, but at pH 2.0 and 10.0 the activity is reduced to 10–20%. Azalomycin B is fairly unstable in alkaline solution rather than in acidic solution. On the contrary, azalomycin F is rather stable at alkaline pH. After heating at 100° C. for 30 minutes at pH 4–6, the activity still remains unchanged, but the potency is reduced to zero when heated at 60° C. for 30 minutes at pH 2.0.

THE MICROORGANISM

The above-described new antibiotics, azalomycins B and F, can be produced by cultivation of a microorganism called *Streptomyces hygroscopicus* K5–4 on a suitable nutritive medium. The method for production of azalomycins B and F by microbiological process will be described below. *Streptomyces hygroscopicus* K5–4 may also be referred to as *Streptomyces hygroscopicus* var. *azalomyceticus*, indicating that strain K5–4 is a variety of *Streptomyces hygroscopicus* which produces azalomycin B and F.

The microorganism useful for the preparation of azalomycins B and F, *Streptomyces hygroscopicus* K5–4, is a newly discovered strain of Streptomyces isolated from a soil sample obtained at Shibuya in Tokyo, Japan. Cultures of this microorganism can be obtained by preparing a suspension in sterile water of a soil sample containing it, allowing the heavier particles to settle, plating out the resulting supernatant soil suspension in serial dilutions on nutrient agar plates, incubating the plates at 24 to 28° C. to provide microorganism growths and transplanting selected individual growths resembling *Streptomyces hygroscopicus* K5–4 to fresh nutrient agar plates. Upon repeated selection and transplantation of uncontaminated and characteristic growths to fresh nutrient agar plates, the constituting pure cultures of the desired microorganism are obtained.

A culture of the living organism has been deposited with American Type Culture Collection, and has been added to its permanent collection as ATCC 13810. The taxonomic studies give the following findings.

To determine the growth characteristics of *Streptomyces hygroscopicus* K5–4 the culture was grown on a variety of media and incubated at 27–29° C. for a month.

According to the microscopic observation, aerial hyphae are well-branched, bear conidia in chain and sometimes forms tightly closed spirals. Conidia are spherical and 1.5–1.7μ in diameter. The cultural characteristics are shown in Table 1.

of this invention, K5–4, is characterized by the following facts: hydrophobic character on the glucose-asparagine agar; grayish red brown aerial mycelium on the synthetic agar; no soluble pigments in either the glucose-asparagine or the synthetic agar; good growth with abundant white aerial mycelium on potato plug; and rather rapid liquefaction of gelatin.

Recently, however, Tresner and Backus (Tresner, H. D., and E. J. Backus: A broadened concept of the characteristics of *Streptomyces hygroscopicus*, Appl. Microbiol. 4: 243–250, 1956), gave a broadened concept of the characteristics of *Streptomyces hygroscopicus* as follows: (1) The brownish-gray (mouse gray to benzo brown according to Ridgway) color of the spores in the mass; (2) the tightly wound coils of spore-bearing hyphae; and (3)

Table 1.—*Cultural Characteristics of* Streptomyces Hygroscopicus K5–4

| Medium | Growth | Aerial mycelium | Soluble pigment |
|---|---|---|---|
| Glucose-asparagine agar | Good, colorless to white | Powdery, abundant, grayish white to grayish red patches. | None. |
| Ca-malate glycerol agar | Good, flat, spreading, colorless to white | Powdery, thin, white to grayish white with white margin. | Do. |
| Synthetic agar | Scant, colorless to white | Powdery, scant, grayish white to grayish red brown patches. | Do. |
| Starch agar | Good, colorless to grayish white, reverse light olive gray. | Powdery, abundant, light gray to brownish black, starch is hydrolyzed. | Do. |
| Glycerol agar | Good, flat, pale yellow, reverse buff | Powdery, abundant, light brownish gray to grayish red brown. | Light yellow. |
| Tyrosine agar | Restricted, white to pale yellow, reverse pale reddish brown. | Powdery, scant | None. |
| Yeast-extract agar | Good, wrinkled, olive ochre to dark yellow orange. | Powdery, abundant, white to purplish gray, later black at moist. | Do. |
| Nutrient agar | Scant, colorless to white | Scant, white | Do. |
| Glucose-bouillon agar | Good, colorless to white | Powdery, abundant, white | Do. |
| Synthetic solution | Scant, flaky sediment, no surface growth | None | Do. |
| Nutrient broth | Restricted ring, white spongy colonies on surface, flaky sediment. | Scant, white | Do. |
| Glucose-bouillon broth | Scant, spongy colonies on surface without ring | None | Do. |
| Potato plug | Good, raised, much folded colorless to cream yellow. | Powdery, abundant, white | Potato becomes dark brownish black. |
| Carrot plug | Moderate, pale yellow to cream | do | None. |
| Milk | cream-colored ring, ivory buff to grayish brown | Scant, white, rapid peptonization without coagulation. | Do. |
| Gelatin stab | Moderate, colorless to white | Scant, white, rapid liquefaction | Do. |
| NaNO³-peptone water | White colored ring with flaky sediment | None, nitrites not produced from nitrate | Do. |

The results of these studies indicate that the microorganism usually makes a good growth. The vegetative mycelium is colorless to yellow and the reverse of the colony is reddish brown.

The aerial mycelium on most of the media is abundant and turns to grayish red brown. A light yellow soluble pigment is produced in the glycerol agar medium, but not in the others. The most remarkable characteristics of the strain is the distinct hygroscopicity which is observed on the yeast-extract agar.

The utilization of carbon sources was tested with a basal medium described by Pridham and Gottlieb. The results are indicated in Table 2.

Table 2.—*Utilization of Carbon Sources*

| Carbon source | Growth | Carbon source | Growth |
|---|---|---|---|
| Mannose | ++ | Dulcitol | ± |
| Lactose | ++ | Salicin | ± |
| Rhamnose | ++ | Inulin | ± |
| Starch | ++ | Arabinose | − |
| Maltose | + | Fructose | − |
| Raffinose | + | Sorbose | − |
| Sucrose | + | Xylose | − |
| Mannitol | + | Na-citrate | − |
| Sorbitol | + | Na-succinate | − |
| Inositol | + | Na-acetate | − |

NOTE.—++ equals good growth and positive utilization; + equals moderately good growth and positive utilization; ± equals faint growth, probably no utilization; − equals no growth, no utilization.

Among known species of Streptomycetes, *Streptomyces hygroscopicus*, isolated by Jensen in 1931 (Waksman, S. A., and A. T. Henrici: *Streptomyces hygroscopicus*, Bergey's Manual of Determinative Bacteriology, 7th ed., pp. 796–797, 1957), is similar to the strain of this invention, K5–4, but detailed comparison still shows that they are readily distinguishable. For example, the strain the characteristic black hygroscopic areas on certain agar media. According to this concept, the strain of this invention, K5–4, may be considered to belong to *Streptomyces hygroscopicus* group, but it is distinguished from the authentic strain described in the literatures in some of the characteristic properties. Thus, it is reasonable to designate the strain of this invention as *Streptomcyces hygroscopicus* K5–4.

There have been also reported several strains of *Streptomyces hygroscopicus* group which produce some antibiotics such as carbomycin-producing *S. hygroscopicus*-like strain (Pagano, J. P., M. J. Weinstein and C. M. McKee: An anti-rickettsial antibiotic from a Streptomycete, M–4209. I. Biological characterizations. Antibiot. and Chemoth. 3 (9): 899–902, September 1953), hygromycin-producing *S. hygroscopicus* (Pittenger, R. C., R. N. Wolfe, M. M. Hoehn, P. N. Marks, W. A. Dairy and J. M. McGuire: Hygromycin I, Preliminary studies on the production and biologic activity of a new antibiotic. Antibiotics Annual 1953/54: 157–166, 1954), hygroscopin-producing *S. hygroscopicus* var. *odoratus* (Nakazawa, K. K. Oki, I. Tadokoro, M. Honjo, H. Hitomi and J. Ueyanagi: Studies on Streptomyces, Hygroscopin, an antibiotic substance active against fungi and phytopathogens. J. Agr. Chem. Soc. Jap. 28 (4): 296–299, 1954, Tatsuoka, S. A. Miyake, M. Honjo, H. Hitomi, J. Ueyanagi, M. Miyamoto, K. Nakazawa and K. Oki: Studies on antibiotics. Purification of hygroscopin. J. Antibiotics, Ser. B7 (9): 329–332, December 1956), and angustmycin-producing *S. hygroscopicus* var. *angustmyceticus* (Yuntsen, Hsu, K. Ohkuma, Y. Ishii and H. Yonehara: Studies on angustmycin, III. J. Antibiotics, Ser. A9 (6): 195–201, December 1956). Judging from the morphological differences observed between these strains and the strain, K5–4, as well as noting the differences in chemical and biological properties between azalomycins B and F and the antibiotics in the literatures mentioned above, it may be concluded that the strain of this invention, K5–4, is not identical with any of the strains of *S. hygroscopicus* group hitherto reported.

THE ANTIBIOTICS

The production of azalomycins B and F in accordance with the present invention is carried out by inoculating a sterile aqueous nutrient medium with *Streptomyces hygroscopicus* K5–4, incubating the inoculated medium under aseptic aerobic conditions at a temperature between about 20 to 35° C., and isolating the desired azalomycins B and F from the solid material present in the culture mixture and the aqueous culture liquid.

For the inoculation, spores or conidia of *Streptomyces hygroscopicus* K5–4 can be used. Aqueous suspensions of the same containing a minor proportion of soap or other wetting agent can also be used. For large fermentations it is preferable to use vigorous, young cultures of the microorganism.

Suitable aqueous nutrient media are those having a pH between 5 and 8 preferably between 5.5 and 7.5, and containing an assimilable carbon source and a source of nitrogen and minerals. As assimilable carbon sources, either the pure carbohydrates or the commercially available carbohydrate mixtures may be used. Some examples of the materials which are suitable for this purpose include glucose, mannose, lactose, rhamnose, maltose, starch, glycerine, molasses and the like. The quantity of the carbohydrate present in the nutrient medium is not particularly critical and can vary from about 0.5% to 5% by weight of the total weight of the medium.

The source of nitrogen in the nutrient medium may be of an organic, inorganic, or mixed organic-inorganic nature. Some examples of the many nitrogenous substances which may be employed in the nutrient medium are amino acids, peptones, hydrolyzed and unhydrolyzed proteins, fish meal, soybean meal, corn steep liquor, meat extracts, inorganic nitrates, urea, ammonium salts and the like. Due to the crude nature of most of the readily available nitrogenous substances, the quantity to be added to the nutrient medium varies somewhat in accordance with purity. However, it can be said for practical purposes that nitrogenous materials need not exceed 10% by weight of the total weight of the fermentation medium.

A certain amount of mineral salts is necessary to obtain the best yields of azalomycins B and F. In general, many crude materials, such as corn steep liquor, yeast preparations, soybean meal, etc. contain mineral salts in sufficient amounts. However, in order to insure the presence of adequate amounts of the mineral components of the medium, it is usually advantageous to add a small amount of inorganic salts, such as sodium chloride, calcium carbonate, phosphates, heavy-metal salts, and the like. The preferred concentration of mineral salts is below 1.5% of the nutrient medium.

It is because the yields of the antibiotics, azalomycins B and F, are considerably reduced by the operation beyond the scope of pH between 5 and 8 that the aforementioned scope has been specified in the present invention.

The cultivation of *Streptomyces hygroscopicus* K5–4 in the aqueous nutrient medium can be carried out in a number of different ways. For example, the microorganism can be cultivated under aerobic conditions on the surface of the medium or it can be cultivated beneath the surface of the medium, that is, in the submerged condition, if oxygen is simultaneously supplied.

The preferred method for producing azalomycins B and F on a large scale involves the use of submerged or deep cultures of *Streptomyces hygroscopicus* K5–4. According to this embodiment of the invention, a sterile, aqueous nutrient medium is inoculated with *Streptomyces hygroscopicus* K5–4 and incubated with agitation and aeration at a temperature between about 20–35° C., preferably in the neighborhood of 25–32° C., until a maximum concentration of azalomycins B and F has been produced in the culture liquid. The length of time required for the maximum production of azalomycins B and F varies with the size and type of equipment used. For example, in large-scale commercial fermentation such as are carried out in the tank-type fermentors, maximum production of azalomycins B and F is reached in about two to six days. Incubation time varies with the incubation temperature, method of inoculation and the like. Longer period of incubation time as well as shift of incubation pH to alkaline side appear to result in reduction of the amount of azalomycin B present in the culture liquid. When shaker flasks are used for the incubation, the time of maximum production may be slightly longer than that required for the large-scale fermentation vats. Under the submerged culture conditions, the microorganism develops as more or less discrete particles dispersed throughout the nutrient medium in contrast to the more or less continuous pellicle present on the surface of the medium in the surface culture method. By virtue of this distribution of the organism throughout the medium, large volumes of the inoculated nutrient medium can be cultivated at one time in the large tanks and vats customarily employed in the fermentation industry. Stationary vat fermentors equipped with suitable agitation and aeration devices as well as horizontal rotary drum fermentors have been found to be particularly useful in this respect. However, for the preparation of smaller quantities of the antibiotic or of cultures of the microorganism, the submerged culture method may be carried out in small flasks or jars which are either shaken or stirred by suitable mechanical means.

Agitation and aeration of the culture mixture may be accomplished in a number of ways. Agitation may be provided by turbines, paddles, impellers or other mechanical agitation devices, by revolving or shaking the fermentor itself, by various pumping devices or by the passage of air through the medium. Aeration may be effected by injecting air into the fermentation mixture through open pipes, perforated pipes, porous diffusion media such as carbon sticks, carborundum, sintered glass and the like, or it may be provided by spraying, splashing or spilling the mash into or through an oxygen-containing atmosphere.

In order to isolate the effective substances present in the culture mixture after completion of the fermentation phase of the process, the conventional means usually used for the isolation of effective components contained in various fermentation mixtures may be conveniently employed. On isolating azalomycins B and F from the above-described sources, such means as concentration of the effective substances, removal of impurities and conversion to composition capable of being more readily purified are used in accordance with and by the use of the properties of azalomycins B and F. Difference in solubilities in various solvents, partition coefficients into two liquid layers, absorption affinities, degrees of dissociation of hydrogen ion, salt-forming activities as well as in molecular weights of azalomycins B and F and impurities are the means being made use. As the embodied operations applying these means are involved, for example, dissolution or extraction with solvents, precipitation from solutions and dialysis.

These operations may be carried out in the presence of auxiliaries for dissolution of azalomycins B and F or following conversion of the antibiotics to their sparingly or readily soluble derivatives or others. These means may be applied at any time necessary during obtaining the desired products from the starting materials once or repeated and singly or in combination.

The methods of isolation of azalomycins B and F by the use of aforementioned means will be in detail described below. These detailed methods are, however, to be understood as illustrative but not limited to it.

Upon treating the liquid culture mixture containing mycelium it is preferable to carry out extraction by the use of solvents which dissolve azalomycins B and F but are immiscible with water, such as for example, n-butyl alcohol or solvents which dissolve azalomycin B but are immiscible with water, such as for example, ethyl or butyl acetate. It is desirable to conduct the extraction at a pH between 4.0 and 7.0 but pH below or more than the above may be applicable.

Upon subjecting the solid material containing mycelium and the filtrate separately to isolation procedures azalomycins B and F in the liquid phase can be separated from impurities by the use of difference in partition coefficient between aqueous and organic-solvent layers in the same way as described above and the antibiotics present in the solid material containing mycelium can be extracted with suitable solvents capable of dissolving the antibiotics such as methanol, ethanol, acetone, n-butanol, acetic-acid esters and the like.

When the culture liquid containing or without mycelium is concentrated or solidified by vacuum distillation or spray drying, azalomycins B and F can be isolated in the same way as described in the aforementioned case of solid material containing mycelium. If the degree of concentration is low the treatment is effected in the same way as described above regarding the case of liquid culture mixture. Azalomycins B and F dissolved in the solvent can be isolated by removing the solvent by such means as vacuum distillation. Alternatively, they may be isolated by precipitating them following addition of solvent in which they are almost insoluble, such as for example, petroleum ether or water, to the solution. Further alternatively, the effective substances may be isolated by removing the impurities by washing the residue with solvent in which they are almost insoluble after removing the solvent in which they are dissolved. Separative isolation of azalomycins B and F from syrup or precipitates after removal of the solvent is effected by the use of difference is solubilities in solvents. Andydrous acetone, ethyl acetate, ether, hexane and the like may be employed because they readily dissolve azalomycin B but hardly azalomycin F. The azalomycin B thus obtained is readily crystallized as the crude crystals when allowed to stand, preferably at low temperatures, after removal of the solvent to a suitable degree. Azalomycin F is obtained as pale yellow or light gray crystals as it is precipitated from the aforementioned solvent such as anhydrous acetone or ethyl acetate. The crude powdery azalomycins B and F can be purified by treating them with various organic solvents, a solvent or solvent mixtures such as, for example, methanol, ethanol, ethyl acetate, butanol and the like through procedures such as concentration, standing and cooling. Addition of active carbon or use of adsorbing agent such as active alumina in a suitable amount may be helpful for removal of impurities in this case.

On account of the aforementioned properties of azalomycins B and F it is conceivable that the substances obtained by the invention are new ones and may be easily isolated.

Examples will be shown below where combinations of plural methods of isolation are shown. However, it will be understood from the descriptions above that by each single method of isolation also may be carried out the process according to this invention. Now that properties of the effective substances are disclosed as above it will be evident by those skilled in the art that the object of this invention can be attained also by other alternations or modified methods which are not concretely described in the specification of the present invention.

BIOLOGICAL PROPERTIES OF AZALOMYCINS B AND F

Antimicrobial spectra of azalomycins were examined by two fold agar dilution method for a period of 1–4 days. The antibiotics were dissolved in a small amount of dimethylformamide and diluted with sterilized water to give final agar media containing less than one percent of the solvent, which was not a harmful concentration against the organism tested. Studies with most bacteria were conducted in a glycerol-bouillon medium (1% glycerol was added). C. diphtheriae was tested in Loeffler's medium, M. tuberculosis $H_{37}$ Rv in Kirchner's medium, C. tetani in T.G.C. medium and St. equi and D. pneumoniae in a bouillon added with 10% rabbit serum. For yeasts and Trichophyton asteroides Sabouraud medium and for the other fungi potato-sucrose medium were used. Trichomonas vaginalis was tested in Hamada's medium. The results are shown in Table 3.

Azalomycin B is effective against gram-positive bacteria, but shows little activity against mycobacteria and no activity against yeast or fungi.

Azalomycin F, on the contrary, demonstrates a very broad spectrum. It is effective in vitro against yeasts, fungi and Trichomonas as well as gram-postive bacteria generally at concentrations of less than 10 mcg./ml.

Table 3.—Antimicrobial Spectra of Azalomycins B and F

| Test organism | Minimum inhibitory concentration (mcg./ml.) | |
|---|---|---|
| | Azalomycin B | Azalomycin F |
| Bacillus subtilis PCI 219 | 0.78 | 3.12 |
| Staphylococcus aureus 209 P | 0.78 | 6.25 |
| Sarcina lutea | 1.56 | 3.12 |
| Corynebacterium diphtheriae | 0.63 | 0.63 |
| Streptococcus equi | 5 | >20 |
| Diplococcus pneumoniae | 5 | >20 |
| Clostridium tetani | 1.25 | 10 |
| Mycobacterium 607 | >100 | 50 |
| Mycobacterium phlei | 100 | 25 |
| Micobacterium tuberculosis $H_{37}$ Rv | 100 | 50 |
| Escherichia coli NIHJ | >100 | >100 |
| Pseudomonas aeruginosa | >100 | >100 |
| Candida albicans | >100 | 1.56 |
| Saccharomyces cerevisiae | >100 | 3.12 |
| Zygosaccharomyces salsus | >100 | 1.56 |
| Torula utilis | >100 | 12.5 |
| Tricophyton asteroides | >100 | 3.12 |
| Aspergillus oryzae | >100 | 12.5–25 |
| Aspergillus niger | >100 | 12.5–25 |
| Penicillium chrysogenum Q 176 | >100 | 1.56–3.12 |
| Piricularia oryzae | >100 | 1.56–3.12 |
| Ophiobolus miyabeanus | >100 | 1.56–3.12 |
| Alternaria kikuchiana | | 1.56–3.12 |
| Sclerotinia libertiana | | 0.78 |
| Fusarium licopersici | | 6.25–25 |
| Fusarium lini | | 6.25–12.5 |
| Ceratostomella fimbriata | | 12.5–25 |
| Corticium vagum | | 0.78 |
| Botrytis cinerea | | 1.56 |
| Trichomonas vaginalis | | 6.25 |

The $LD_{50}$ in mice of azalomycin B is 281 mg./kg., when given intraperitoneally.

By the same route, that of azalomycin F is 25.9 mg./kg.

Azalomycins B and F are valuable substances for preventions of potential infections with pathogenic microorganisms in human beings, animals and plants. Azalomycin B has a broad-spectrum antimicrobial activities, mainly against Gram-positive bacteria, and particularly it is remarkably inhibitory against diphtheritic pathogens. Azalomycin F has antifungal, antiprotozoal and antibacterial activities and is very useful for the treatment of infections with Trichophyton, Trichomonas and the like. Azalomycins B and F may be used in suitable forms, such as for example, in the form of powdery mixture with inactive diluents, ointment consisted of azalomycin and inactive ointment base, or if desired, diluted solution or suspension in physiological saline solution or water containing compatible surface active agent. In the case of powders or ointment, azalomycin B or F may be conveniently used in concentrations between 5 mg. and 10 mg. per gram of the preparation. The solution or suspension of a concentration between 0.1% and 1% may be also employed. Azalomycins B and F are advantageous in that they are relatively of low toxicities and are stable under various conditions of use. Upon using azalomycin B or F as a growth-inhibiting agent against bacteria, fungi and protozoae it is applied directly to the infected region, and if necessary, the treatment is periodically repeated. Azalomycin B or F may be employed, if desired, in combination with other antimicrobial or chemotherapeutic agents.

The following examples illustrate suitable methods for preparing, purifying and fractionating azalomycins B and F.

EXAMPLE 1

In each of one-hundred and twenty 500 cc.-shaking fermentation bottles is placed and sterilized 100 cc. of a medium containing glycerine 1%, glucose 0.5%, dry yeast 1%, soy-bean powders 0.5%, dibasic potassium phosphate 0.2% and sodium chloride 0.3% in the conventional way. A loopful of mycelium of *Streptomyces hygroscopicus* K5-4 cultivated on Krainsky-agar slant is inoculated and the inoculated bottles are incubated with shaking for a period of 5 days. The production of azalomycins B and F then reaches to: 160 $\gamma$/cc. of azalomycin B and 500 $\gamma$/cc. of azalomycin F in the mycelium and 120 $\gamma$/cc. of azalomycin B and 400 $\gamma$/cc. of azalomycin F in the broth.

The culture media are collected and the mycelium is separated by filtration. The wet mycelium weighs 1 kg. and is subjected to extraction with 5 kg. of acetone. The solvent is distilled off in vacuum to precipitate azalomycins B and F from the residual aqueous solution. The dried precipitates are dissolved in 50 cc. of methanol and to the solution are added 200 cc. of ether to separate azalomycin B which is soluble and azalomycin F which precipitates.

The broth, 10 l. in volume, is extracted with ⅓ volume of butanol, and the extract is concentrated to a volume of about 50 cc. Addition of 5-times volume of hexane leads to separation of soluble azalomycin B and precipitated azalomycin F.

The ether and hexane solution of azalomycin B are concentrated in vacuum. The residue is dried and dissolved in about 50 cc. of ethyl acetate. The solution is subjected to extractions successively with equal amounts of 2% sodium-bicarbonate solution and 0.01 N hydrochloric acid to remove impurities, followed by washing with distilled water. Cooling gives precipitation of about 500 mg. of crude crystals of azalomycin B.

The aforementioned precipitates are combined and dissolved in 40 cc. of methanol, followed by addition of 200 cc. of acetone to precipitate azalomycin F as well as to remove the soluble impurities. The azalomycin F is dissolved in 20 cc. of methanol and the solution is partition-chromatographed on neutral alumina using ethyl acetate as the fixed phase. The product is eluted with 20%-aqueous methanol and recrystallized from methanol. Pure azalomycin F is obtained as needle crystals weighing about 1 g.

EXAMPLE 2

Fifty liters of a medium containing glycerine 1%, glucose 0.5%, press yeast 3%, soy-bean meal 0.5%, dibasic potassium phosphate 0.2% and sodium chloride 0.3% are placed in a 100 l.-fermentation tank. The aqueous medium is sterilized under pressure by the conventional method and inoculated with 500 cc. of shake culture of *Streptomyces hygroscopicus* K5-4 (cultivated at 27° C. for 4 days). The inoculated medium is incubated at 28±1° with aeration of 40 l. per minute and agitation of 250 r.p.m. After 48 hours' incubation 47 l. of culture liquid (involving mycelium) containing 150 $\gamma$/cc. of azalomycin B and 780 $\gamma$/cc. of azalomycin F are obtained.

EXAMPLE 3

To 30 l. of the culture liquid of azalomycins B and F (containing 3.5 g. of azalomycin B and 22 g. of azalomycin F) obtained in the same way as in Example 2 are added 20 l. of n-butyl alcohol. The mixture is agitated and separated by a centrifuge into 3 parts, waste broth, mycelium and n-butyl-alcohol layer. The n-butyl-alcohol layer is concentrated in vacuum to a syrup to which 1 l. of ethyl acetate is added. The insoluble matter and solution are separated and to the insoluble matter are added 200 cc. of methanol to dissolve the former. The solution is filtered and to the filtrate is added 1 l. of acetone. The mixture is allowed to stand and the precipitates formed are collected and dried to obtain 7 g. of crude azalomycin F purity 50%.

The ethyl-acetate solution described above is concentrated in vacuum to give a concentrate of azalomycin B.

To 2.7 kg. of the wet mycelium are added 10 l. of acetone and the mixture is vigorously stirred and filtered. The mycelium is further extracted in the same way as above with 10 l. of 20% aqueous acetone. The combined acetone extracts are concentrated in vacuum to distil off the acetone. Precipitates formed in the concentrate (aqueous layer) are collected and dissolved in 500 cc. of methanol. The insoluble matter is separated and to the solution are added 3 l. of acetone. The mixture is allowed to stand overnight and the precipitates thus obtained are collected by centrifuge and dried to obtain 17.5 g. of light gray crude azalomycin F (purity 75%).

EXAMPLE 4 pH of 250 l. of the culture liquid (containing 24 g. of azalomycin B and 170 g. of azalomycin F) obtained in the same way as in Example 2 is adjusted to 4.0 with 10% hydrochloric acid. To the resulting mixture are added 200 l. of ethyl acetate and 6 kg. of Hyflo Super-cel, a filter aid comprising diatomaceous earth having an average particle size of 8 to 10, followed by vigorous agitation and filtration.

Thirty kilograms of the wet mycelium (containing the super cell) is extracted successively with each 100 l. of 90% and 80% acetones. The combined acetone extracts are concentrated in vacuum and the precipitates thus formed are collected and dried to give 195 g. of gray powders. The powders are washed with two portions of 500 cc. of ethyl acetate. The dried residue is crude azalomycin F weighing 96 g. (purity 74%). Recrystallization from 90% aqueous methanol gives 40 g. of light gray powders of azalomycin F (purity 95%).

The aqueous ethyl acetate solution separated from mycelium by filtration is concentrated in vacuum to about ¹⁄₁₀₀₀ volume. The concentrate is washed twice with 2% sodium-bicarbonate solution and once with 0.1% hydrochloric acid, each being in ¹⁄₁₀ volume, to remove impurities. The resulting concentrate is further concentrated and allowed to stand overnight at cold place to precipitate crude crystals. The crystals are filtered and dried to obtain 8.4 g. of powders of crude azalomycin B (purity 91%).

EXAMPLE 5

Seven grams of crude azalomycin F obtained in Example 3 are dissolved in 1 l. of n-butanol while warming at 40° C. Insoluble matter is filtered off and the filtrate is concentrated in vacuum to dryness. The residue is dissolved in 50 cc. of methanol and insoluble matter is filtered off. To the filtrate are added 600 cc. of acetone and the mixture is allowed to stand to separate a sufficient amount of precipitates. The precipitates thus formed are collected and dissolved in 30 cc. of methanol. The solution is treated with 0.5 g. of charcoal powders for decolorization and filtered. To the filtrate are added 200 cc. of acetone to give precipitates, which are filtered and washed with 50 cc. of ethyl acetate. The resulting crystals are recrystallized from 90% methanol and dried to give 2.5 g. of white needles of azalomycin F, M.P. 125-127° C.

I claim:

1. Azalomycin B, a substance being a neutral white needle crystal; containing the elements carbon, hydrogen and oxygen; being soluble in methanol, ethanol and chloroform, moderately soluble in acetone and ethyl acetate, sparingly soluble in ether and benzene and almost insoluble in water and petroleum ether; giving a dark brownish black color but making no silver mirror by Tollens test, giving a green color by Fehling test, decolorizing potassium permanganate and giving negative Molisch, anthrone and ferric-chloride tests; melting at a temperature in the range of 185–187° C.; having a degree of optical rotation $[\alpha]_D^{25}$ of −48° (1% in methanol); having analytical data: C, 61.88; H, 8.72; $OCH_3$, 10.12; having a molecular weight: 272.33, and having a molecular formula $C_{14}H_{24}O_5$; having an ultraviolet absorption spectrum in methanol solution exhibiting a maximum of $$E_{1\ cm.}^{1\%} \text{ 790 at 252.5 m}\mu$$

and exhibiting a characteristic absorption in the infrared region on the spectrum, in potassium bromide pellet, at the following frequencies expressed in reciprocal centimeters: 3450, 2970, 1695, 1640, 1565, 1460, 1420, 1380, 1345, 1300, 1280, 1250, 1220, 1175, 1145, 1110, 1085, 1050, 1030, 1015, 995, 980, 945, 900, 876, 860, 815, 795, 745, 716, 705, 673 and 664.

2. Azalomycin F, a substance being a white needle crystal; containing the elements carbon, hydrogen, oxygen and nitrogen; being soluble in methanol and ethanol, moderately soluble in 20% aqueous acetone, sparingly in acidic water and almost insoluble in alkaline water, acetone, ethyl acetate and chloroform; giving a dark brownish black color by Tollens test, giving a brown color in concentrated sulfuric acid and a wine color in concentrated hydrochloric acid, giving negative Molisch, anthrone, Fehling, ferric-chloride, ninhydrin, Millon and biuret tests and giving positive ninhydrin test after 2 minutes' hydrolysis with 5 N hydrochloric acid; melting at a temperature in the range of 125–127° C.; having a degree of optical rotation $[\alpha]_D^{22}$ of +46° (1% in methanol); having analytical data: C, 60.41; H, 8.57 and N, 4.33; having a molecular weight: 598.72, and having a molecular formula $C_{30}H_{50}O_{10}N_2$; having an ultraviolet absorption spectrum in methanol solution exhibiting maxima of $$E_{1\ cm.}^{1\%} \text{ 385 at 240 m}\mu$$

and $$E_{1\ cm.}^{1\%} \text{ 235 at 268 m}\mu$$

and minimum of $$E_{1\ cm.}^{1\%} \text{ 216 at 258 m}\mu$$

and exhibiting a characteristic absorption in the infrared region of the spectrum, in potassium bromide pellet, at the following frequencies expressed in reciprocal centimeters: 3460, 2940, 1690, 1645, 1555, 1450, 1380, 1285, 1240, 1150, 1085, 970, 915, 875, 840, 805, 745, 690 and 662.

3. A process for the production of azalomycins B and F which comprises cultivating *Streptomyces hygroscopicus* var. *azalomyceticus* under aerobic conditions at a temperature in the range from 20 to 35° C. in an aqueous nutrient medium having a pH between 5 and 8 and containing an assimilable carbon source and a source of nitrogen and minerals, recovering the mixture of azalomycins B and F so produced from the medium and separating the said mixture into azalomycin B and azalomycin F.

4. The process of claim 3, wherein the nitrogen source is selected from the group consisting of amino acids, peptones, hydrolyzed proteins, unhydrolyzed proteins, fish meal, soy bean meal, corn steep liquor, meat extracts, inorganic nitrates, urea and ammonium salts and is present up to approximately 10% by weight of the total weight of the fermentation medium.

5. The process of claim 3, wherein the source of minerals is selected from the group consisting of corn steep liquor, yeast preparations, soybean meal and inorganic salts, selected from the group consisting of sodium chloride, calcium carbonate, phosphates and heavy metal salts, and is present below 1.5% by weight of the total weight of the medium.

6. The process of claim 3, wherein the carbon source is a carbohydrate.

7. The process of claim 6, wherein the carbohydrate is selected from the group consisting of glucose, mannose, lactose, rhamnose, maltose, starch, glycerine and molasses and is present from approximately 0.5% to 5% by weight of the total weight of the medium.

8. The process of claim 3, wherein the carbohydrate is selected from the group consisting of glucose, mannose, lactose, rhamnose, maltose, starch, glycerine and molasses and is present from approximately 0.5% to 5% by weight of the total weight of the medium, the nitrogen source is selected from the group consisting of amino acids, peptones, hydrolyzed proteins, unhydrolyzed proteins, fish meal, soybean meal, corn steep liquor, meat extracts, inorganic nitrates, urea and ammonium salts and is present up to approximately 10% by weight of the total weight of the fermentation medium, and the source of minerals is selected from the group consisting of corn steep liquor, yeast preparations, soybean meal, sodium chloride, calcium carbonate, phosphates and heavy metal salts, and is present below 1.5% by weight of the total weight of the medium.

9. The process of claim 8, wherein the temperature range is between 25 and 32° centigrade.

No references cited.